Feb. 13, 1945.   G. E. NEVILL   2,369,403
MEANS AND METHOD OF SURVEYING WELLS
Original Filed March 18, 1935

INVENTOR
BY  *Gale E. Nevill*

ATTORNEYS

Patented Feb. 13, 1945

2,369,403

UNITED STATES PATENT OFFICE 2,369,403

MEANS AND METHOD OF SURVEYING WELLS

Gale E. Nevill, San Antonio, Tex., assignor to James V. Robinson, Montebello, Calif.

Continuation of application Serial No. 11,694, March 18, 1935. This application October 30, 1942, Serial No. 463,920

7 Claims. (Cl. 33—205)

The invention relates to well surveying instruments and in particular to devices adapted to determine and record the amount and direction of the inclination of well bores.

This application is a continuation of application Serial No. 11,694, filed March 18, 1935 on behalf of Gale E. Nevill, and entitled "Means and method of surveying wells."

Difficulty has been experienced in obtaining accurate compass bearings of readings of well bore inclination where a magnetic compass is employed and the device is run inside of a steel pipe or casing because of the magnetic interference of the surrounding steel. This difficulty has been avoided in some instances by positioning the compass type instrument within a special section of pipe of non-magnetic material, but high cost and inability to find such a material possessing suitable physical properties were encountered. The magnetic interference may be overcome by running the compass instrument in an open or uncased hole, but the risk of a cave-in of the walls of the well with the consequent loss of the device is undesirable. Furthermore, when a well is being drilled by the rotary method the drill stem must be removed from the well to permit the use of a magnetic type surveying instrument in an open hole.

It is an object of the invention to provide a means whereby a compass type well surveying instrument may be lowered and raised through the inside of a steel drill pipe and extended downwardly through an opening in the drill bit so that the compass will be spaced away from the steel parts to avoid magnetic interference.

It is a further object of the invention to provide a directional survey instrument which is adapted for use as a dummy wire line core barrel to be lowered through the drill pipe and engage the normal core barrel seat, at the same time extending a compass survey instrument downwardly through the core receiving opening and sufficiently in advance of the core bit to avoid magnetic interference.

It is another object of the invention to provide a method of obtaining a directional survey of a well with a magnetic type instrument and without the necessity of removing the drill pipe from the well bore.

It is yet another object to seat a surveying instrument in the core barrel seat so that its position in the drill stem will be known without the use of a measuring line or similar device.

These and other objects and advantages of the invention will be readily apparent to one skilled in the art when the following description is read in connection with the accompanying drawing, wherein.

Figure 1:
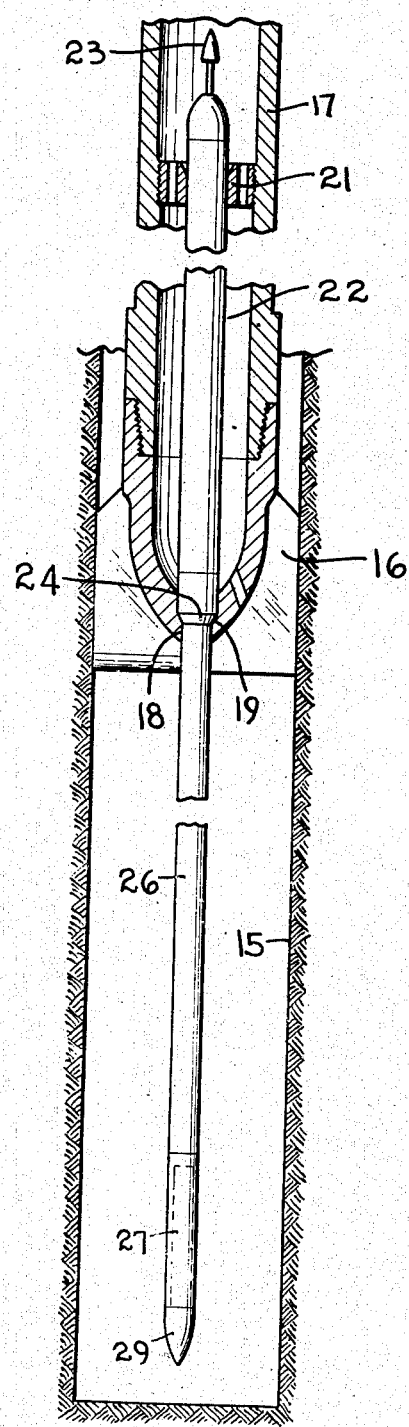
Fig. 1 is a side view, partially in section, showing a core bit and a dummy retrievable core barrel seated therein and embodying features of the invention.
Figure 2:
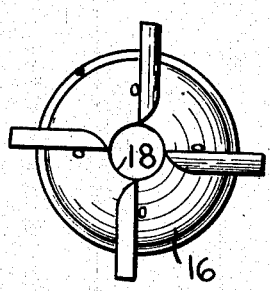
Fig. 2 is a bottom view of a core bit of the type shown in Fig. 1.
Figure 3:
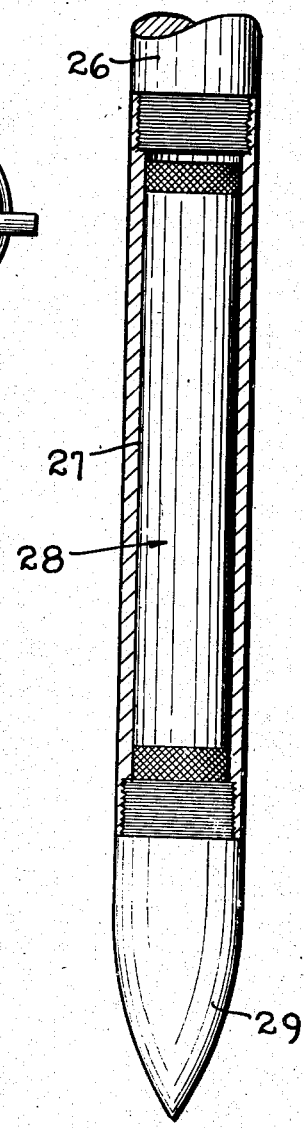
Fig. 3 is a partially sectional view of the lower end of a dummy core barrel extension showing the housing in which a magnetic compass type survey instrument may be located.

In Fig. 1 the well bore is indicated at 15. The well has therein a drill bit 16 adapted to drill the well. The bit 16 is threadedly attached to a suitable drill collar 17, which in turn may be connected to a conventional rotatable drill pipe (not shown). The drill bit 16, frequently termed a wire line core bit, has a central axial opening or core inlet 18, which may be best seen in Fig. 2. The bit has a core barrel seat, such as 19, which is adapted to receive a retrievable core barrel which may be inserted downwardly and removed upwardly through the drill collar and drill pipe, which together constitute the drill stem. A perforated guide bushing, such as 21, may be placed in the drill collar to support the upper end of a core barrel in axially aligned position.

Instead of the regular core barrel which is inserted through the bushing 21 and adapted to engage the seat 19 so as to receive a core, there is here provided a dummy core barrel 22, which may be provided at its upper end with a suitable dog or head 23 adapted to be engaged by an overshot usually lowered on a wire line. At its lower end the dummy core barrel is formed with a shoulder 24 adapted to engage and be supported on the seat 19 of the bit 16.

Attached to the dummy barrel and forming a part thereof is the extension, or downwardly extending section 26, which may be of brass, aluminum, or other non-magnetic material. A cavity or recess 27, formed near the lower end of the extension 26, provides a suitable chamber in which to locate the surveying instrument itself, which is indicated generally at 28. The pointed plug 29 seals the lower end of the cavity 27 and guides the assembly during its downward movement through the drill pipe, drill collar and core bit.

The surveying instrument 28 is preferably of the type which determines orientation by means of a magnetic compass, and it is apparent that close proximity of steel or other magnetic materials will very probably result in erroneous data, and therefore in order to avoid the magnetic interference from the steel bit and associated parts the extension 26 is made sufficiently long so that the compass in the instrument is advanced far enough ahead of the bit to be substantially free from such interference.

A simple form of compass type surveying instrument suitable for use with the invention is that disclosed in the patent to Macgeorge, No. 270,597, Jan. 16, 1883. Of course, more elaborate forms of instruments employing magnetic orienting means may be employed without departing from the spirit of the invention.

It will be seen therefore that the invention is particularly adapted for use in drilling operations normally employing a wire line or retrievable core barrel type of drilling tool or bit.

In some instances a single bit has been known to drill as much as 1,000 feet of hole without replacement, and the time saving resulting from such long runs is quite important as there is no drilling time lost in pulling the drill stem from the hole to replace the bit. It will be seen that it may be imperative to secure directional surveys of the hole as the drilling progresses, and it is equally desirable to do this without performing the otherwise unnecessary operation of pulling the drill stem just to permit the use of an instrument in an open hole.

In the use of the present invention the survey is made with the regular core barrel removed from the bit and drill stem. The bit is raised and suspended off bottom a sufficient distance and the dummy barrel containing the survey apparatus is either lowered through the drill stem until it comes to rest on the seat 19 with the extension allowed to protrude through the core opening to space the compass away from the bit. After the magnetic bearing and amount of inclination of the well bore have been determined the apparatus is raised or retrieved for observation and inspection and the regular drilling routine is resumed.

The time required for this entire performance will usually be less than an hour as compared to several hours required to make a "round trip" with the drill stem and bit. It will be seen that a directional survey is obtained with a simple magnetic instrument without pulling the drill stem, thus avoiding the risk incident to an open hole run, and at the same time accurate compass bearings are secured.

What is claimed as new is:

1. The combination with a drill stem and a core forming drill of magnetic material attached to the lower end thereof and having a central axial opening, of a core barrel seat formed in the opening, a guide spaced above said seat and axially aligned therewith, a dummy core barrel lowerable and removable through said drill stem, a shoulder on said dummy core barrel formed to engage said seat, said dummy core barrel being adapted to be supported in aligned position by said seat and guide, a section on said dummy core barrel extending downwardly therefrom and adapted to pass through the axial opening in said drill as said dummy core barrel is lowered into seated position, and a chamber in said section adapted to hold a magnetic type directional well surveying instrument therein, said extension section being of non-magnetic material and adapted to space the compass of the instrument a sufficient distance away from the drill to substantially avoid magnetic interference.

2. The combination with a drill stem and a drilling tool of magnetic material attached to the lower end thereof having a central axial opening, of a core barrel seat aligned with the opening, a dummy core barrel adapted to be run through said drill stem and formed to engage said seat, a non-magnetic section on said dummy core barrel extending downwardly through the axial opening of said drilling tool and in advance thereof, and a chamber in said non-magnetic section formed to receive a directional surveying instrument including a compass and adapted to space the compass from said drilling tool whereby the compass is located beyond the magnetic field of said drilling tool substantially free from magnetic interference when the dummy barrel engages said seat.

3. The combination with a drill stem and a drilling tool of magnetic material attached to the lower end thereof and having a central axial opening, of a seat aligned with said opening and in spaced relation thereto, a dummy barrel adapted to be run in and out through said drill stem and formed to engage said seat, a non-magnetic section on said dummy barrel, said section being arranged to extend axially and downwardly through the axial opening and in advance thereof when the barrel engages said seat, and a recess in said non-magnetic section formed to hold a directional survey instrument including a compass, said non-magnetic section being formed to space the compass of the surveying instrument beyond the magnetic field of the magnetic material of said drill stem and drilling tool when the dummy barrel is in seated position whereby magnetic directional surveys may be obtained while the drill stem is in the hole.

4. In combination, a tubular drill stem, a drilling tool thereon having a central axial opening, a housing adapted to be run through said drill stem, an extension on said housing of non-magnetic material and formed to be extended downwardly through the opening in said drilling tool, a chamber in said extension adapted to hold a compass type directional well surveying instrument, and means to support the housing in aligned position whereby the compass of the instrument is spaced below and away from the steel of said drill and associated parts a sufficient distance to substantially avoid magnetic interference.

5. In combination, a tubular drill stem, a core forming drill thereon having an inlet for a core, a supporting seat in said drill, a housing lowerable through said drill stem and arranged to engage and be supported by said seat, a non-magnetic extension on said housing formed to extend through the opening in said drill and in advance thereof when said housing is in seated position, said extension having a chamber adapted to contain a directional well surveying instrument including a compass, and adapted to space the compass a sufficient distance below and away from the steel of said drill and associated parts to substantially avoid magnetic interference.

6. In combination, a tubular drill stem, a drilling tool attached to the lower end thereof and having an opening therethrough, a housing adapted to be run in and out of the well through said drill stem, means for limiting the downward movement of said housing in said drill stem and drilling tool, a non-magnetic section on said housing, and an instrument recess in said non-magnetic section formed to hold a compass type well surveying instrument adapted to determine the amount and direction of well deviation, said non-magnetic section being formed to locate the surveying instrument beyond the magnetic field of, and in advance of said drilling tool when the housing is in lowermost position, whereby the direction of deviation may be determined substantially free from interference due to magnetic material in the drilling tool and associated parts.

7. Apparatus of the character described comprising a well tube formed of magnetic material and having a support adjacent its lower end, a removable housing on the support and formed with an extension composed of non-magnetic material which is extended beyond the well tube and which is provided with a chamber adapted to contain a directional well surveying instrument including a compass, said extension being of such length that the chamber will be located a distance from the adjacent end of the well tube such that said surveying instrument will, when in operating position, be located beyond the magnetic field of the well tube.

GALE E. NEVILL.